United States Patent [19]
Warrier et al.

[11] Patent Number: 5,974,463
[45] Date of Patent: Oct. 26, 1999

[54] SCALEABLE NETWORK SYSTEM FOR REMOTE ACCESS OF A LOCAL NETWORK

[75] Inventors: Padmanand Warrier; Roger Richter, both of Harris County, Tex.

[73] Assignee: Compaq Computer Corporation, Houston, Tex.

[21] Appl. No.: 08/871,323

[22] Filed: Jun. 9, 1997

[51] Int. Cl.[6] .................................................. G06F 15/16
[52] U.S. Cl. .......................................... 709/225; 709/229
[58] Field of Search ........................ 395/200.55, 200.59, 395/200.68; 709/225, 229, 238, 250, 203, 217, 218, 219

[56] References Cited

U.S. PATENT DOCUMENTS

| | | | |
|---|---|---|---|
| 5,287,461 | 2/1994 | Moore | 395/200.49 |
| 5,530,703 | 6/1996 | Liu et al. | 370/255 |
| 5,598,536 | 1/1997 | Slaughter, III et al. | 395/200.58 |
| 5,774,667 | 6/1998 | Garvey et al. | 395/200.52 |
| 5,812,819 | 9/1998 | Rodwin et al. | 395/500 |
| 5,896,369 | 4/1999 | Warsta et al. | 370/338 |

OTHER PUBLICATIONS

"Control Unveils Breakthrough Virtual Remote Access Server" http://www.control.com/news/pr/ivspr.htm, May 15, 1997.
AccelePort RAS Family http://www.dgii.com, No date.
Hayes Centry RAS http://www.hayes.com/prodinfo/ras.html, 1998.

*Primary Examiner*—Mehmet B. Geckil
*Attorney, Agent, or Firm*—Akin, Gump, Strauss, Hauer & Feld, LLP

[57] ABSTRACT

A network system that provides a scaleable and distributed architecture to enable a plurality of remote clients to access a local area network (LAN). The network system includes an access server that executes a network operating system (NOS), such as any standard NOS, to enable communication with the LAN, an access bus, an access device coupled to the access server and the access bus that cooperates with the NOS to establish a communication link between the access server and the clients, and at least one multiport device coupled to the access bus and coupled to one or more clients through corresponding wide area network (WAN) connections that cooperates with the access device to establish a communication link between clients and the access device. The access server is preferably implemented on an industry standard platform using industry standard components. The access bus is either a dedicated bus or a shared media bus, such as Ethernet. The multiport and access devices cooperate to link each client to the access server as though directly connected thereto. Each multiport device includes a plurality of port slots, each for receiving one of a plurality of communication cards coupled to a remote clients via corresponding WAN connections. Each communication card operates according to one of a plurality of different communication protocols.

24 Claims, 7 Drawing Sheets

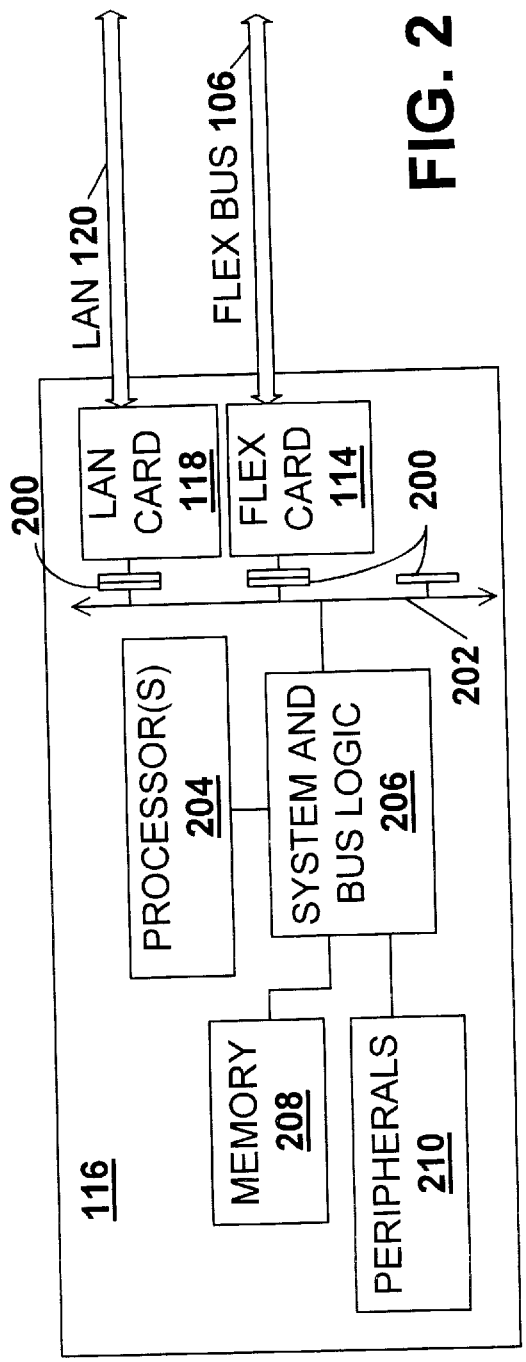
FIG. 2
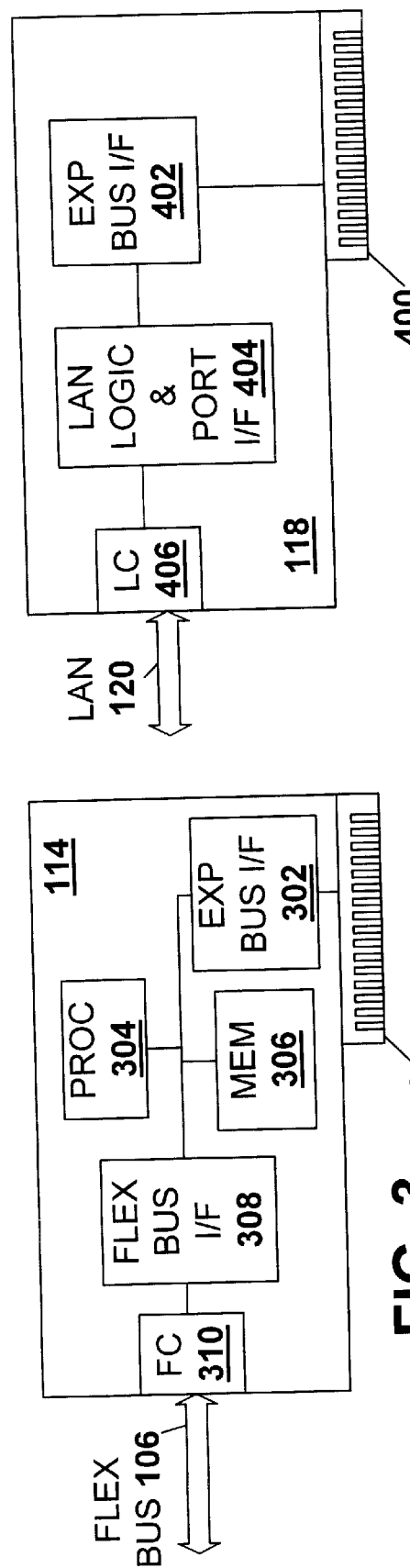
FIG. 4
FIG. 3

SCALEABLE NETWORK SYSTEM FOR REMOTE ACCESS OF A LOCAL NETWORK

FIELD OF THE INVENTION

The present invention relates to a scaleable network system for enabling remote access of a local network.

DESCRIPTION OF THE RELATED ART

There is often the need to remotely connect to a central local area network (LAN) to gain access to a file or application server on the LAN. Remote connection provides access to popular applications, such as electronic mail (email), file transfer, on-line services and support to a user, customer or client at a home-based office or using a portable computer. Such remote access is generally accomplished via a remote connection across a wide area network (WAN) to a local access configuration coupled to the LAN.

One remote access configuration was a central proprietary hardware device usually operating proprietary software. A single vendor provided a proprietary hardware device or "box" that was connected to the central LAN. The central box further included a number of ports that remote clients connected to according to any one of several types of WAN connections, such as analog connections including V.34 modems or serial ports connected to external modems or digital connections including Integrated Services Digital Network (ISDN) BRI or PRI ports, T1, fractional T1 or E1 ports, etc.

For example, a "pizza box" ran proprietary software and included 4, 8 or 16 fixed-type ports. Since the number of ports and port-type was fixed, the user had to decide in advance the maximum number of ports that were needed as well as the port type, such as analog or digital. A "shirt box" was similar in that it ran proprietary software and included a fixed number of ports, but also provided several port type options which could be changed by the user. In particular, a fixed number of PCMCIA (PC Card) slots were provided to receive either analog or digital cards.

The pizza and shirt box solutions had a major disadvantage in that they were limited by a fixed number of ports or port types. A user had to purchase another hardware device or box to increase the number of ports, which resulted in several stand-alone and relatively independent boxes coupled to a server. Multiple and independent boxes to increase the number of ports created manageability issues such as tracking multiple configurations, version numbers for both hardware and software, troubleshooting, etc.

A "hat box" solution included a chassis with several slots, each for receiving a plug-in card that connected to a backplane bus. The backplane bus was either proprietary or based on a standard bus. Each plug-in card typically supported one or two access technologies, such as ISDN PRI or BRI cards, T1/E1 cards, etc. The hat box solution addressed larger port densities (64 ports or more) but was too costly for lower port density needs. Furthermore, only up to a particular maximum number of ports were still available. A "refrigerator box" was a superset of the hat box, where a multiple number of hat box devices or the like were connected together through a common management device and managed as a single entity. Either of these solutions were relatively expensive due to their proprietary nature. The multiple device solutions for smaller port densities could not be leveraged to the single device, larger port solution. Thus, it was difficult to grow from smaller to larger port numbers.

Another significant problem with the proprietary solutions discussed above was that products of one vendor typically did not operate with the products of another vendor, so that choices were limited to a few vendors for a user with particular needs. Furthermore, standalone devices usually were not integrated with a PC server running a commercial network operating system (NOS). A commercial NOS typically ran on an industry standard platform, such as a PC server or the like, rather than proprietary hardware. Such lack of integration forced a user to log on twice for authentication, once for the network access device and a second time for the NOS. Also, the user could not take advantage to share any intelligence that may exist in both the stand alone device and the commercial NOS.

In another remote access configuration, a commercial NOS vendor provided the software necessary to work with industry standard media interface cards such as NICs, multiple port WAN cards, modem cards, ISDN cards, etc. The interface card manufacturers typically provided the software associated with the card, such as device drivers, installation software, configuration software, etc., where such software was designed to work under the NOS. Nonetheless, the user had the responsibility of procuring the PC, the interface cards and of finding and loading all of the software necessary to establish the remote connections. The user further had the responsibility to integrate the hardware and software, if possible, and to troubleshoot problems associated with multi-vendor hardware and software.

The typical multi-vendor solution using a commercial NOS had several disadvantages. First, and foremost, was a lack of adequate support for the several products provided by various vendors. The user was forced to integrate, troubleshoot and maintain the equipment and software. Also, the communication equipment in the form of modems and ISDN cards or the like were plugged into server slots, so that the server had to be colocated. This often resulted in server rooms with a plurality of multiport cards connected to external devices such as modems, which were further connected to data connections and telephone company connections via cables. Such complex cable configurations produced a cabling problem that was difficult to manage. The cabling problem could partly be addressed by the use of trunk lines, where several modems were aggregated onto a single modem device using digital signal processing (DSP) techniques or the like. However, such multiple communication or trunk lines allowed a limited number of channels per line, and trunk lines still required the PC and communication equipment to be co-located.

It is desired to provide a reliable, scaleable, flexible, and efficient network system or architecture without many of the problems or disadvantages described above.

SUMMARY OF THE INVENTION

A network system according to the present invention provides a scaleable and distributed architecture to enable a plurality of remote clients to access a local network, such as a local area network (LAN). The present invention provides many advantages and substantially eliminates many of the disadvantages of network architectures of prior art. A network system according to the present invention includes an access server that executes a standard network operating system (NOS) to enable communication with the LAN, where a standard NOS is any common, popular or commercially available NOS that is not specific to any particular or proprietary network architecture. The network system further includes an access bus, an access device coupled to the access server and the access bus that cooperates with the NOS to establish a communication link between the access server and the clients, and at least one multiport device coupled to the access bus and coupled to one or more clients through corresponding wide area network (WAN) connections that cooperates with the access device to establish a communication link between clients and the access device.

The access server is preferably implemented on an industry standard platform using industry standard components, such as personal computer (PC) systems or server systems based on the x86 architecture or the like. The access server preferably executes an application programming interface (API) to facilitate communication between the NOS and clients coupled through the access device. The access server includes an expansion bus with a plurality of expansion slots for receiving expansion cards. A generic LAN expansion card or the like is coupled to the LAN and is plugged into onto one of the expansion bus slots to enable communication with the LAN. The access device is also preferably implemented as an expansion card plugged into an expansion slot of the access server, and typically operates in conjunction with driver software running on the access server.

The access bus is either a dedicated bus, such as a PCI bus or the like, or a shared media bus, such as Ethernet, Token Bus, Token Ring, CDDI, FDDI, ATM, etc. The access bus is preferably a shared media bus, which provides the advantage of enabling the access server and the multiport devices to be separated by any length up to the maximum limits of the particular architecture of the access bus. The network system is scaleable in that any number of multiport devices may be coupled to the access bus to connect any number and any type of remote clients as desired.

Each multiport device includes a plurality of port slots, a system bus coupled to the port slots and interface logic coupled between the system bus and the access bus. The system bus may include one or more external bus extensions to enable daisy chaining of the multiport devices. A plurality of communication cards are provided, where each is configured to plug into a multiport device port slot and to couple to a remote client via a WAN connection. Each communication card includes communication logic to operate according to one of a plurality of different communication protocols to enable a communication link between a corresponding client and the multiport device. The multiport device performs WAN data framing, flow control and WAN signaling protocols with clients through a communication card plugged into a port slot. In this manner, the network system is not limited to any particular type of port and thus any number of any port type may be used to access the LAN via the appropriate communication cards.

The multiport device also performs media and connection management functions to establish and maintain communication between each of its clients and the access device across the access bus. The access device performs data and traffic management on the access bus and also performs media and connection management in cooperation with one or more multiport devices to establish and maintain communication links between one or more clients and the LAN. A plurality of multiport devices may be coupled to the access bus, where each multiport device connects a corresponding plurality of clients through WAN connections or remote transmission channels. The access device cooperates with each of the multiport devices to establish a communication link between the access server and one or more of the clients.

Upon initialization or reset, the multiport device optionally configures each remote device coupled to it and announces itself and its remote devices on the access bus for registration purposes. The access device receives the port information associated with the multiport devices and the remote clients, registers the clients, and then passes the necessary information to the NOS for authentication. Alternatively, configuration information is supplied to the access device, which may then perform both registration and authentication. The multiport device also detects new clients connected during operation and initiates the registration process for each new client. The registration may be general or may be qualified by domain names. Domain names are used, for example, to qualify which port or group of ports are "visible" to certain access servers. The cooperation between the multiport device and the access device establishes a communication link between each client and the access server, where the user performs a single logon with the NOS to access the LAN. In this manner, the multiport and access devices establish and maintain communication between the LAN and registered client devices.

Other servers and/or computers may be coupled to the access bus to expand the capabilities of the network system. In one embodiment, a second access server coupled to a second LAN is connected to the access bus to allow the remote clients access to the second LAN. A second access card is plugged into the second access server and coupled to the access bus to establish a plurality of communication links to the second LAN in cooperation with the NOS operating on the second server. Ownership of the ports of the remote clients may be distributed in any desired manner. For example, a first domain may be defined for the first access server and a second domain name may be defined for the second access server. Each access card responds to a qualified announcement to complete registration if indicated by the appropriate domain name. In this manner, a remote client gains access to the first or second LAN by announcing with the first or second domain name, respectively.

The second access server may operate as a backup access server to improve reliability by connecting it to the same LAN, where the backup access server tracks operation of the first or primary access server. Thus, both the primary and the backup access servers are coupled to the same access bus and to common services on the same LAN. The backup access server effectively mirrors all operations of the primary access server without affecting those operations. If and when the primary access server fails, the backup access server takes control and the transfer is effectively transparent to the remote clients. A backup server configured in this manner substantially improves reliability.

For purposes of management, a management probe may be coupled to the access bus for managing operations of the network system. Security may be enforced at any one or any combination of three points of communication, including communication between the access server and the access device, communication between the access device and any of the multiport devices, and communication between any multiport device and its remote clients. A common security policy may be enforced at all three points if desired. The data stream may be encrypted at the access server, at the access device or at the multiport devices, and decrypted by software running on each remote client. Security may also be enhanced by coupling a security server to the access bus. The security server is used to establish a uniform policy of secure access on the access bus. Also, data encryption may occur at the security server if desired.

It is appreciated that a network system according to the present invention substantially improves reliability, scaleability, flexibility, and efficiency of remote connections to one or more LANs. Reliability is improved since cable management problems are substantially reduced or eliminated. Also, a backup server is easily added to the system. The access bus provides substantial flexibility by enabling one or more multiport devices to be physically separated from the access server. The present invention is scaleable and flexible in that as many ports and port types as desired may be connected to the access bus at any time. Each communication card conforms to any WAN connection protocol supported by a corresponding remote client, so that a user does not have to commit to any particular transmission or communication protocol. An initial network system may have as few as one remote client and may be expanded to as many remote clients as desired. The multiport and access devices cooperate with each other across the access bus to provide convenient and efficient communication links between each remote client and one or more access servers. The access device plugged into the access server presents registered clients to the NOS as though the remote clients were directly coupled to the access server. Security is enforceable at multiple points and may be enhanced by adding a security server to the access bus. In this manner, the present invention provides almost all the benefits of both proprietary and multi-vendor solutions while substantially eliminating all of the disadvantages.

BRIEF DESCRIPTION OF THE DRAWINGS

A better understanding of the present invention can be obtained when the following detailed description of the preferred embodiment is considered in conjunction with the following drawings, in which:

FIG. 2 is a simplified and representative block diagram of the access server of FIG. 1;

FIG. 3 is a simplified and representative block diagram of the FLEX CARD of FIG. 1;

FIG. 4 is a simplified and representative block diagram of the LAN card of FIG. 1;

DETAILED DESCRIPTION OF THE PREFERRED EMBODIMENT

Figure 1:
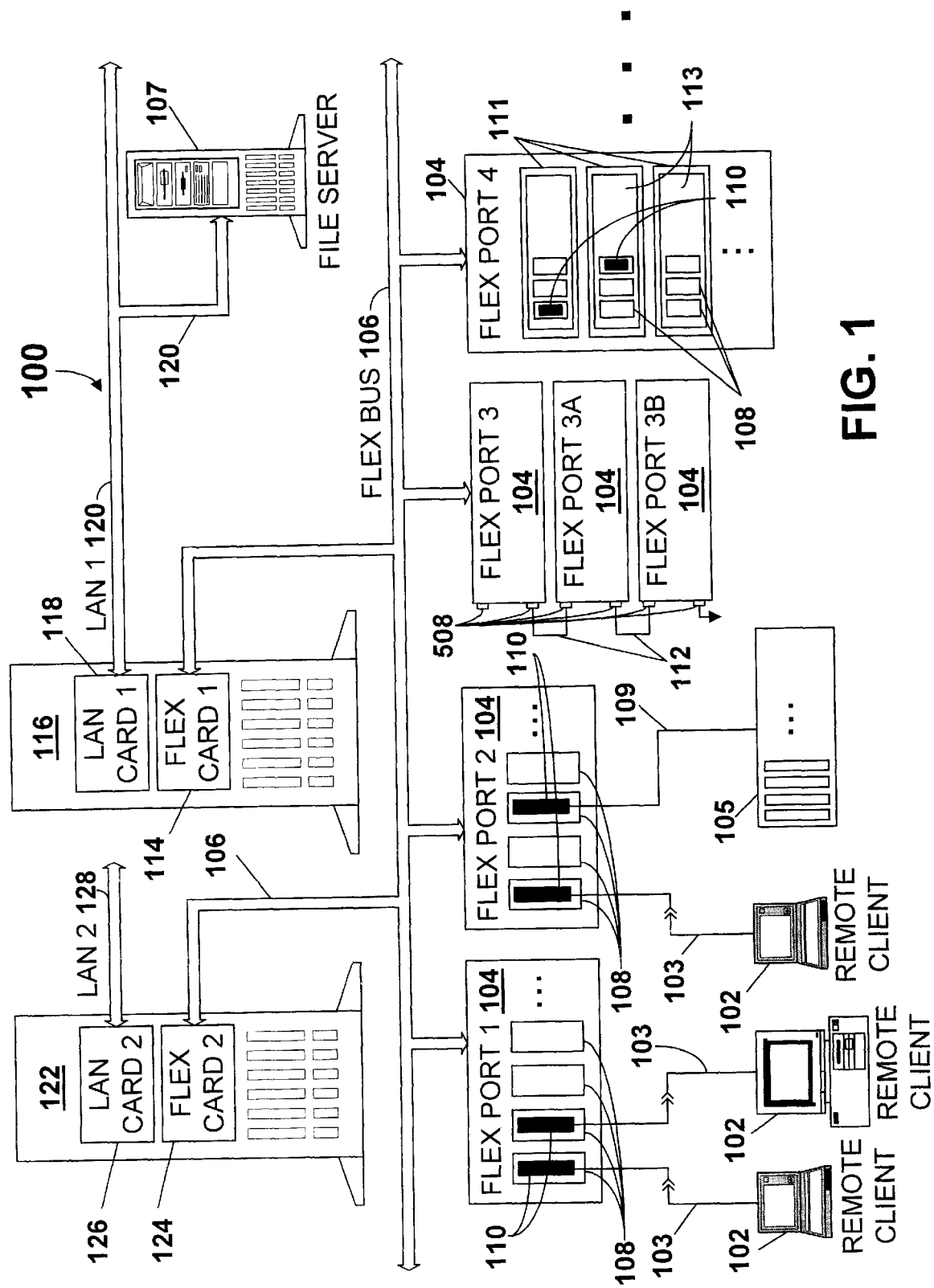
FIG. 1 is a block diagram of a network system according to the present invention that connects one or more remote clients and other devices in a wide area network (WAN) configuration to at least one local area network (LAN)

Referring now to FIG. 1, a network system 100 is shown that connects one or more remote clients 102 and other devices to at least one local area network (LAN), such as a first LAN 120 (LAN 1), to enable remote access to resources, applications and services on the LAN 120. The resources include equipment and computers coupled to the LAN 120, such as one or more file servers 107, and applications and services including electronic mail (email), file transfer, on-line services, customer and client support from home based offices, as well as any other applications and services incorporated or supported on the LAN 120.

Each remote client 102 is implemented using any type of computer system, workstation, node, data terminal equipment (DTE) or the like, such as a laptop, portable or desktop computer system or the like. The inclusion of the remote clients 102 creates a wide area network (WAN) with remote communication links to one or more central LANs.

One or more FLEX PORTs 104 are coupled to a common FLEX BUS 106, where each FLEX PORT 104 includes a plurality of port slots 108 configured to receive a corresponding communication card 110. Each FLEX PORT 104 is implemented in any desired manner, such as a box (FLEX PORTs 1, 2, 3, 3A, 3B) with port slots 108 or as a chassis (FLEX PORT 4) having module slots 111 for receiving corresponding modules 113, where each module 113 includes one or more port slots 108 for receiving communication cards 110. Each communication card 110 is configured to communicate with a remote client 102 via a remote transmission channel connection 103 according to any one of several types of available and known communication protocols, telecommunications standards or data transport mechanisms, including but not limited to, analog modulatioin/demodulation (using modems) or serial communication, or any switched-media architecture, such as BRI (Basic Rate Interface) or PRI (Primary Rate Interface) ISDN (Integrated Services Digital Network), T1, E1, T3, Frame Relay, X.25, ATM (Asynchronous Transfer Mode), etc. Any type of wireless connection between any remote client 102 and a corresponding communication card 110 is also contemplated to form all or part of the remote transmission channel connection 103. Each communication card 110 plugged into a port slot 108 of a FLEX PORT 104, and operates to convert data formats to enable data transfer between the remote client 102 and the corresponding FLEX PORT 104. Each FLEX PORT 104, in turn, buffers and converts data for enabling data transfer across the FLEX BUS 106.

Each remote connection 103 is established using any particular type of media, transmission channel or carrier available and/or combinations thereof between the particular remote client 102 and the FLEX PORT 104, such as phone lines, local loops, leased lines, T1 lines, fiber optic cables, wireless communication links, etc. A corresponding communication protocol is used to enable data transfer and communication, such as TCP/IP (Transmission Control Protocol/Internet Protocol), PPP (Point to Point Protocol), SLIP (Serial Line Internet Protocol), etc. Since each communication card 110 provides the necessary conversion and translation depending upon the particular transmission mechanism and protocol between the corresponding FLEX PORT 104 and remote client 102, each FLEX PORT 104 effectively supports any combination of communication protocols or data transport mechanisms as desired. For example, an analog modem card may be plugged into a first slot 108 of a FLEX PORT 104, while an ISDN card is plugged into a second slot 108, a T1 card plugged into a third slot 108, and so on. Local connections may also be made between one or more clients and any one of the FLEX PORTs 104. In FIG. 1, a fan-out box 105 is connected to a communication card 110 via a cable 109 or the like, where the fan-out box 105 includes a plurality of port slots for connecting one or more local or remote clients.

Each FLEX PORT 104 is a standalone device that is connected anywhere on the FLEX BUS 106. The FLEX BUS 106 is either a shared media bus, such as an Ethernet bus, Token Bus, Token Ring, CDDI (copper distributed data interface), FDDI (fiber distributed data interface), ATM or the like, or a dedicated bus, such as PCI, VMEbus, Micro Channel, etc. As many FLEX PORTs 104 as supported by the FLEX BUS 106 may be added to connect as many remote clients 102 as desired. For example, for an Ethernet star configuration, another cable segment is added to a hub device, such as a repeater or switch, to the new FLEX PORT 104. For a dedicated bus like PCI, a FLEX PORT card or associated PCI card is plugged into a slot of a computer system (not shown) for coupling to the FLEX BUS 106.

Each FLEX PORT 104 includes a backplane or system bus 506 (FIG. 5) that is electrically coupled to each plug-in communication card 110 when plugged into any one of the port slots 108. This is also true for a chassis implementation (FLEX PORT 4), where the modules 113 electrically interface the port slots 108 to the system bus 506. The system bus 506 preferably includes at least one and more preferably two external bus extensions 508 for chaining two or more FLEX PORTs 104 together. If two external bus extensions 508 are provided, each is coupled to opposite ends of the system bus 506 for extending the system bus 506 in either direction. For example, FIG. 1 shows a FLEX PORT 3 coupled to the FLEX BUS 106 and further daisy-chained to a FLEX PORT 3A, which is further daisy-chained to a FLEX PORT 3B, which may further be daisy-chained in this manner to other FLEX PORT devices. A suitable bus cable 112 includes appropriate connectors for interfacing the bus extensions 508 to extend the system bus 506 of a given FLEX PORT 104.

The FLEX BUS 106 is further connected to a FLEX CARD 114 (flex card 1) plugged into one slot 200 (FIG. 2) of an expansion bus 202 of an access server 116 (access server 1). If the FLEX BUS 106 is a dedicated bus, one or more FILEX PORTs 104 may share components, circuitry and software, such as a common processor, memory, drivers, etc., with one or more FLEX CARDs 114. A shared media bus enables the access server 116 and each of the FLEX PORTs 104 to be physically located at remote and/or convenient locations with respect to each other. The FLEX BUS 106 is the communication link between the FLEX PORTs 104 and the FLEX CARD 114 for providing access to the LAN 120. A LAN card 118 (LAN card 1) is plugged into another slot 200 of the expansion bus 202 of the access server 116 for interfacing the LAN 120.

The access server 116 is preferably an industry standard platform implemented using industry standard components, such as personal computer (PC) systems or server systems based on the x86 architecture or the like. The access server 116 also preferably executes a standard Network Operating System (NOS). A standard NOS is any common, popular or commercially available NOS that is not specific to any particular or proprietary network architecture, such as Windows NT, Novell Netware®, to name a couple of examples. A network system according to the present invention is flexible, however, and is not limited to any particular type of hardware or software platform or configuration. In this manner, the user has complete flexibility as to the configuration of the network system 100 without having to rely on any one particular manufacturer or network provider.

A second, optional access server 122 (access server 2) is shown including another FLEX CARD 124 (flex card 2) coupled to the FLEX BUS 106 and another LAN card 126 (LAN card 2) for interfacing and enabling access to a second LAN 128 (LAN 2). The two LANs 120, 128 could either be different LANs or different connections to the same LAN. The access server 122, the FLEX CARD 124 and the LAN card 126 are typically implemented in a similar manner as the access server 116, the FLEX CARD 114 and the LAN card 118, respectively. The access server 122 provides and controls access to resources, services and applications on the LAN 128.

FIG. 2 is a simplified block diagram of the access server 116, which includes one or more processors 204 coupled to system and bus logic 206, which is further coupled to memory 208, one or more peripherals 210 and the expansion bus 202. The peripherals 210 include one or more hard drives, floppy drives, CD ROM drives and/or any other internal and external peripheral devices as desired. The memory 208 is any combination of random access memory (RAM) including dynamic RAM (DRAM), static RAM (SRAM) or the like, and read only memory (ROM). The access server 116 may range from a rather simple personal computer (PC) system based on the Intel x86 IBM compatible architecture including a single processor, such as the i486 by Intel or the like, to a more powerful multiprocessor server system including two or more Pentium™, Pentium Pro™, P7 processors etc. Other architectures and computer systems are contemplated as well for implementing the access server 116.

The expansion bus 202 includes a plurality of slots 200 for receiving one or more expansion cards. In FIG. 2, the expansion cards include the FLEX CARD 114 for interfacing the FLEX BUS 106 and the LAN card 118 for interfacing the LAN 120. The processor(s) 204 executes a NOS from the memory 208 and interfaces the FLEX BUS 106 and the LAN 120 via the FLEX CARD 114 and the LAN card 118, respectively. The interface between the NOS and the FLEX CARD 114 is preferably performed by any suitable connection management application programming interface (API), such as the Windows Telephony API by Microsoft or the Telephony Services API (TSAPI) by Novell. TAPI or TSAPI or similar programs provide a common interface for application programs, including those controlling LAN functions, to access and control telephony functions associated with the FLEX CARD 114. The NOS also includes appropriate software to operate according to any type of desired network communication protocol, such as TCP/IP, IPX, etc.

FIG. 3 is a simplified block diagram of the FLEX CARD 114. The FLEX CARD 114 includes a slot connector 300 configured to interface the expansion bus 202 through any one of the slots 200. The slot connector 300 is coupled to an expansion bus interface (I/F) 302, which is further coupled to an optional processor 304, optional memory 306 and a flex bus interface 308. The flex bus interface 308 is further coupled to the FLEX BUS 106 via a flex bus connector (FC) 310. The processor 304, if included, is any one of several known RISC and CISC microprocessors, such as any one of the ARM family, the Hitachi SH family, the Intel i960 family, the Intel x86 family or the Motorola 68K family, and operates a real time operating system (RTOS) that is internally developed or commercially available, such as VxWorks, VrTX or pSOS or the like. The memory 306, if included, is any combination of DRAM, SRAM, ROM, etc.

The FLEX CARD 114 primarily controls the connection management protocol functions of remote clients 102 coupled through the FLEX BUS 106. Such connection management protocol functions include determining, connecting, maintaining connections and disconnecting remote clients 102 coupled as "ports" through the FLEX BUS 106 via the FLEX PORTs 104. These functions include data and traffic management to transmit data to and receive from one or more FLEX PORTs 104 across the FLEX BUS 106. The FLEX CARD 114 performs media management functions including determination of the architecture and media type of the FLEX BUS 106, such as Ethernet, Token Ring, ATM, etc., and the appropriate protocol associated therewith. The FLEX CARD 114 also performs security protocol functions in conjunction with one or more FLEX PORT(s) 104 to register and authorize access privileges to the LAN 120. The FLEX CARD 114 generally acknowledges appropriate registration and obtains ownership of any of the ports associated with remote clients 102 requiring access to the LAN 120 via the FLEX PORTs 104.

A software driver loaded in the memory 208 of the access server 116 operates to control the functions of the FLEX CARD 114 in cooperation with the NOS for establishing communication links between one or more remote clients 102 and the LAN 120. A commercially available NOS is typically configure d to operate with device drivers and installation/configu ration software of network inter face cards (NICs), multiple port cards, modem cards, ISDN cards and the like. The software driver for the FLEX CARD 114 operates in a similar manner but provides a significantly more uniform interface to the NOS regardless of the type or number of remote clients 102 registered. Such uniform interface provides a more efficient communication link between the remote clients 102 and the LAN 120 via the NOS. In one embodiment, the NOS is Windows NT and the FLEX CARD 114 is implemented to interact with Windows NT through the NDIS interface (Network Driver Interface Specification) or according to the I$_2$O SIG (Special Interest Group) specification. The FLEX CARD 114 presents a view to Windows NT as if the ports coupled through the FLEX PORT(s) 104 and the FLEX BUS 106 an d owned by the FLEX CARD 114 are "physically" connected to the access server 116.

If the processor 304 and the memory 306 are included, the FLEX CARD 114 is considered an "intelligent" card where many of the functions described above are performed on the FLEX CARD 114 by the processor 304 and the memory 306. Optionally, the software driver executing on the access server 116 incorporates the intelligent functions of the FLEX CARD 114 if the processor 304 a nd memory 306 are not included. However, the processor(s) 204 of the access server 116 is then used for these functions.

The FLEX CARD 124, if included, obtains ownership of any of the ports requiring access to the LAN 128 and coupled through the FLEX BUS 106 in a similar manner as described for the FLEX CARD 114. If the LANs 120, 128 are the same LAN, the FLEX CARDs 114, 124 divide ownership in an y desired manner based on any predeter tined criterion. Such division of ownership may be based o n predetermined domains if defined. For example, the LAN 120 may belong to a first domain having a first domain name and the LAN 128 may belong to a second domain having a second domain name. The FLEX CARD 114 acknowledges registration and obtains ownership of those ports announcing with the first domain name and the FLEX CARD 124 acknowledges registration and obtains ownership of those ports announcing with the second domain name.

FIG. 4 is a simplified block diagram of the LAN card 118, which includes a slot connector 400 configured to interface the expansion bus 202 via any one of the slots 200. The slot connector 400 is coupled to an expansion bus interface 402, which is further coupled to a LAN logic & port interface block 404. The LAN logic and port interface block 404 is coupled to the LAN 120 via a LAN connector (LC) 406. The LAN card 118 may be any type of generic adapter for interfacing the access server to the LAN 120 for enabling communication and access devices and services of the LAN 120. The LAN 120 operates according to any one of several architectures and protocols, such as Ethernet bus, Token Bus, Token Ring, CDDI, FDDI, ATM to name a few. Almost any commercially available NOS is configured to operate in conjunction with LAN adapters for enabling LAN communications. The LAN card 126 and the LAN 128, if included, or any other LAN coupled to the FLEX BUS 106 may be configured in a similar manner, although any combination of LAN types and configurations is contemplated.

Figure 5:
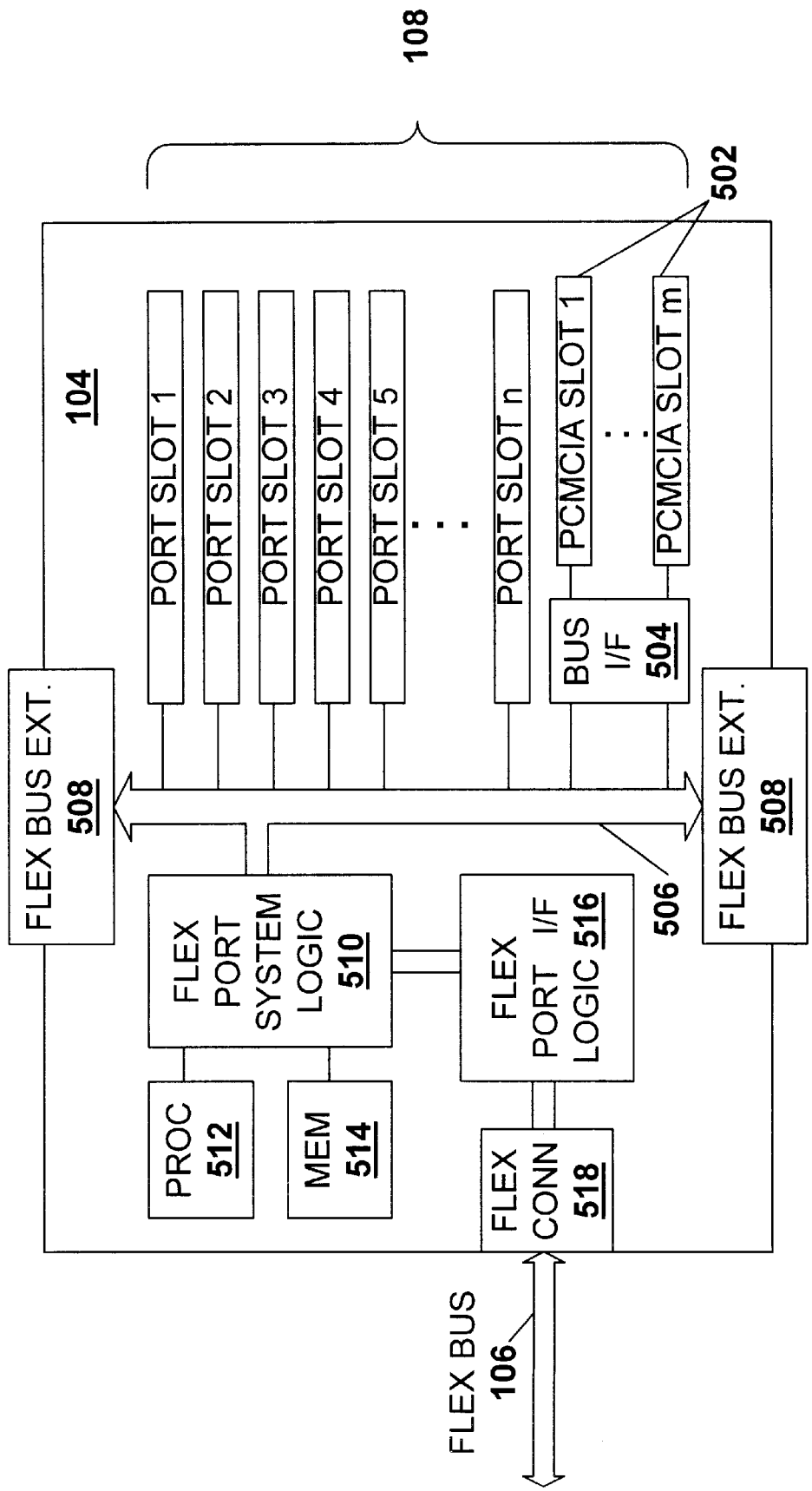
FIG. 5 is a simplified and representative block diagram of any one of the FLEX PORTs of FIG. 1.

FIG. 5 is a simplified and representative block diagram of any one of the FLEX PORTs 104. The FLEX PORT 104 shown in FIG. 5 includes a plurality of port slots 108 of a first type labeled 1 . . . n and a second type labeled 1 . . . m, each for receiving any corresponding one of the communication cards 110 for interfacing a client, such as a remote client 102, a fan-out box 105, etc. Each port slot 108 is configured to receive and couple a communication card 110 to the system bus 506. The physical configuration of the port slots 108 and the communication cards 110 may be standardized so that any port slot 108 accepts any communication card 110 regardless of the type of card, such as modem, ISDN, ATM, X.25, Frame Relay, etc. The port slots 108 may also include different slot formats. The FLEX PORT 104 shown in FIG. 5 shows "im" PC Card slots 502, such as PCMCIA or the like, which are interfaced to the system bus 506 via a bus interface 504. For example, if the system bus 506 is PCI and the slots 502 are configured to receive PC Cards, then the bus interface 504 may be a Cardbus™ bridge or the like.

Alternatively, the chassis format may be utilized as shown in FIG. 1 for the FLEX PORT 4 where the bus 506 is coupled to corresponding connectors of module slots 111, which interfaces corresponding connectors of the modules 113, which further interfaces each of the port slots 108 of each respective module 113. In this manner, the port slots 108 may all be configured in a similar manner like a "shirt box", or may include a combination of different slot configurations in a similar manner as a "hat box", "a refrigerator box", etc.

The system bus 506 may be configured according to any desirable bus standard, such as a PCI bus or the like. The system bus 506 is coupled to flex port system logic 510, which is further coupled to a processor 512, memory 514 and flex port interface logic 516. The processor 512 is any one of several known RISC and CISC microprocessors, such as any one of the ARM family, the Hitachi SH family, the Intel i960 family, the Intel x86 family or the Motorola 68K family, and operates a real time operating system (RTOS) that is internally developed or commercially available, such as VxWorks, VrTX or pSOS or the like. The memory 514 is any combination of DRAM, SRAM, ROM, etc. The flex port interface logic 516 is coupled to the FLEX BUS 106 via a flex bus connector 518. The system bus 506 preferably includes one or two flex bus extensions 508 on opposite ends of the system bus 506 for daisy-chaining two or more FLEX PORTs 104 together as shown in FIG. 1.

Each FLEX PORT 104 is an intelligent multiport configuration device that establishes a communication link between each connect remote client and a FLEX CARD, such as the FLEX CARD 114. Each FLEX PORT 104 performs WAN data framing and flow protocols associated with each of the port slots 108 based on the particular type of communication card 110, as well as any WAN signaling protocols including encryption and compression. The FLEX PORT 104 also performs media management of the FLEX BUS 106 and connection management protocol to determine, connect, maintain connections and to disconnect remote clients 102 in conjunction with the FLEX CARD 114 to register and authorize access privileges. The FLEX PORT 104 may also perform any security protocol functions if desired. During connection, each FLEX PORT 104 performs data and traffic management in cooperation with the FLEX CARD 114 to transfer data between the FLEX CARD 114 and remote clients 102 across the FLEX BUS 106. The FLEX PORT 104 may also track and maintain statistical information associated with network management functions.

Figure 6:
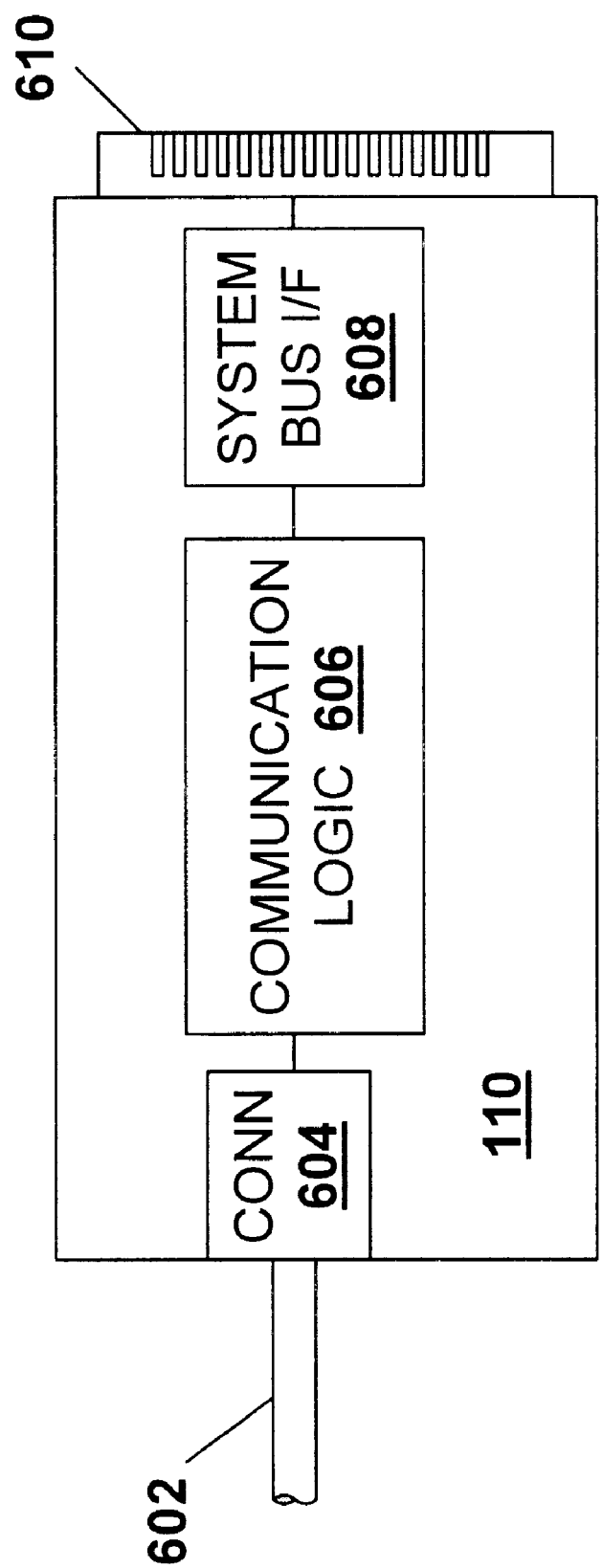
FIG. 6 is a simplified and representative block diagram of a communication card for interfacing a remote client and for plugging into a port slot of any one of the FLEX PORTs of FIG. 1.

FIG. 6 is a simplified and representative block diagram of a communication card 110 that interfaces a remote client 102 via a WAN connection and that plugs into any port slot 108 of any one of the FLEX PORTs 104 of FIG. 1. The card format may be configured in any desired manner, such as for plugging into any of the standard port slots 1 . . . n, or configured as a PC Card for plugging into any one of the PC Card slots 1 . . . m 502, or configured for any other desired slot format. A local cable 602 plugs into a connector 604 mounted on the communication card 110. Any type of suitable cable 602 is contemplated, such as, for example, a Category 3, 4 or 5 cable with RJ-45 connectors, although wireless connections are also contemplated. Communication logic 606 is provided on the communication card 110 and coupled to the connector 604 to communicate with the remote client 102 according to the particular transmission channel and communication protocol of the WAN connection. The communication logic 606 is coupled to system bus interface 608, which is further coupled to a slot connector 610. The slot connector 610 is configured to couple to the system bus 506 when the communication card 110 is plugged into any one of the corresponding port slots 108 of a FLEX PORT 104. The communication logic 606 communicates with the flex port system logic 510 of a FLEX PORT 104 via the system bus interface 608, the slot connector and the system bus 506. In this manner, each communication card 110 is designed to enable communication between a remote client 102 and any of the FLEX PORTs 104 according to the particular transmission channel and communication protocol selected.

FIGS. 1–6 illustrate the reliability, scaleability, flexibility, and efficiency of the network system 100. The network system 100 is more reliable than many prior art network systems since cable management problems are substantially reduced or eliminated. Although a FLEX CARD and FLEX PORT are logical entities and may be combined into a single unit, the addition of the FLEX BUS 106 provides substantial scaleability and flexibility. The FLEX BUS 106 enables the one or more FLEX PORTs 104 to be physically separated from the access server 116 as far as the particular specifications of the implementation of the FLEX BUS 106 allows. An initial network system 100 may have as few as one FLEX PORT 104 and one remote client 102 and may be expanded to as many FLEX PORTs 104 and remote clients 102 as practicably possible. For expansion, any port slot 108 may be expanded through a fan-out box 105. Also, another FLEX PORT 104 is added by connecting it to the FLEX BUS 106 or by daisy-chaining it with an existing FLEX PORT 104 via an external bus extension 508. In this manner, as many ports and port types as desired are connected to the FLEX BUS 106 at any time. The user is not limited to any particular number of ports or to any particular port type and may add any port type at any time.

Since any type of communication card 110 may be plugged into any port slot 108, a user does not have to commit to any particular transmission or communication protocol. The FLEX PORTs 104 handle all of the various communication protocols and effectively isolate communication variations from the FLEX CARD 114. The FLEX PORTs 104 and the FLEX CARD 114 cooperate with each other to provide communication links between the remote clients 102 and the NOS as though the remote clients 102 were directly coupled to the access server 116.

Upon initialization, the FLEX CARD 114 requests a minimum configuration of ports and port types on the FLEX BUS 106 for access to the LAN 120. The FLEX CARD 124, if present, performs a similar function for the LAN 128. Each FLEX PORT 104 detects its existing ports and port types and announces its presence on the FLEX BUS 106 and provides the port connections, port type information and any configuration information of itself and any connected remote clients 102 to register with any one or more FLEX CARDs 114, 124, etc. One or more of the FLEX CARDs acknowledge each FLEX PORT announcement to establish communication to complete the registration process.

The registration process is generalized to enable access to any one FLEX CARD and the corresponding LANs, or qualified by a domain name. Qualified access enables access to only those FLEX CARDs and corresponding LANs within the same domain. If separate domains are defined, they may be divided in any desired manner, such as by LAN or by equipment and services on particular LANs. Also, each FLEX PORT 104 may register within any one or more defined domains or may generally register with all defined domains. Each remote client 102 may have limited access to only one or more particular domains available to the corresponding FLEX PORT 104.

The processor 512, memory 514 and the flex port system logic 510 of each FLEX PORT 104 is implemented to automatically detect new port connections via the port slots 108 as well as the type of port connected. The FLEX PORT 104 optionally configures each new port if desired. The protocol between the FLEX CARDs 114, 124, etc. and the FLEX PORT(s) 104 is robust and allows either side to dynamically make adjustments to internal state tables to allow for connections, disconnections, media changes, etc. Each FLEX PORT 104 announces the connection of any new remote client 102 either generally or with a domain name, if predefined, on the FLEX BUS 106 to the FLEX CARDs. One of the FLEX CARDs completes registration by acknowledging the announcement and taking ownership of the port.

It is appreciated that the FLEX CARDs 114, 124, etc. and each of the FLEX PORTs 104 communicate and cooperate with each other to streamline and simplify the remote connection process, which enables a single logon for each remote client 102, if desired. Additional authentication may be provided by the multiport device, the access device or the security server. A communication link is established between each remote client 102 and an access server, such as the access server 116, where the remote client 102 is then able to logon through the NOS to the associated LAN, such as the LAN 120. The FLEX CARD and FLEX PORT combination takes advantage of any intelligence built into the particular commercial NOS being used. A FLEX CARD may optionally incorporate the functions of a FLEX PORT on the same card and share hardware and software. However, separating the FLEX CARD and the FLEX PORT allows communication equipment incorporating the WAN media connections to be separated from the access server 116.

Figure 7:
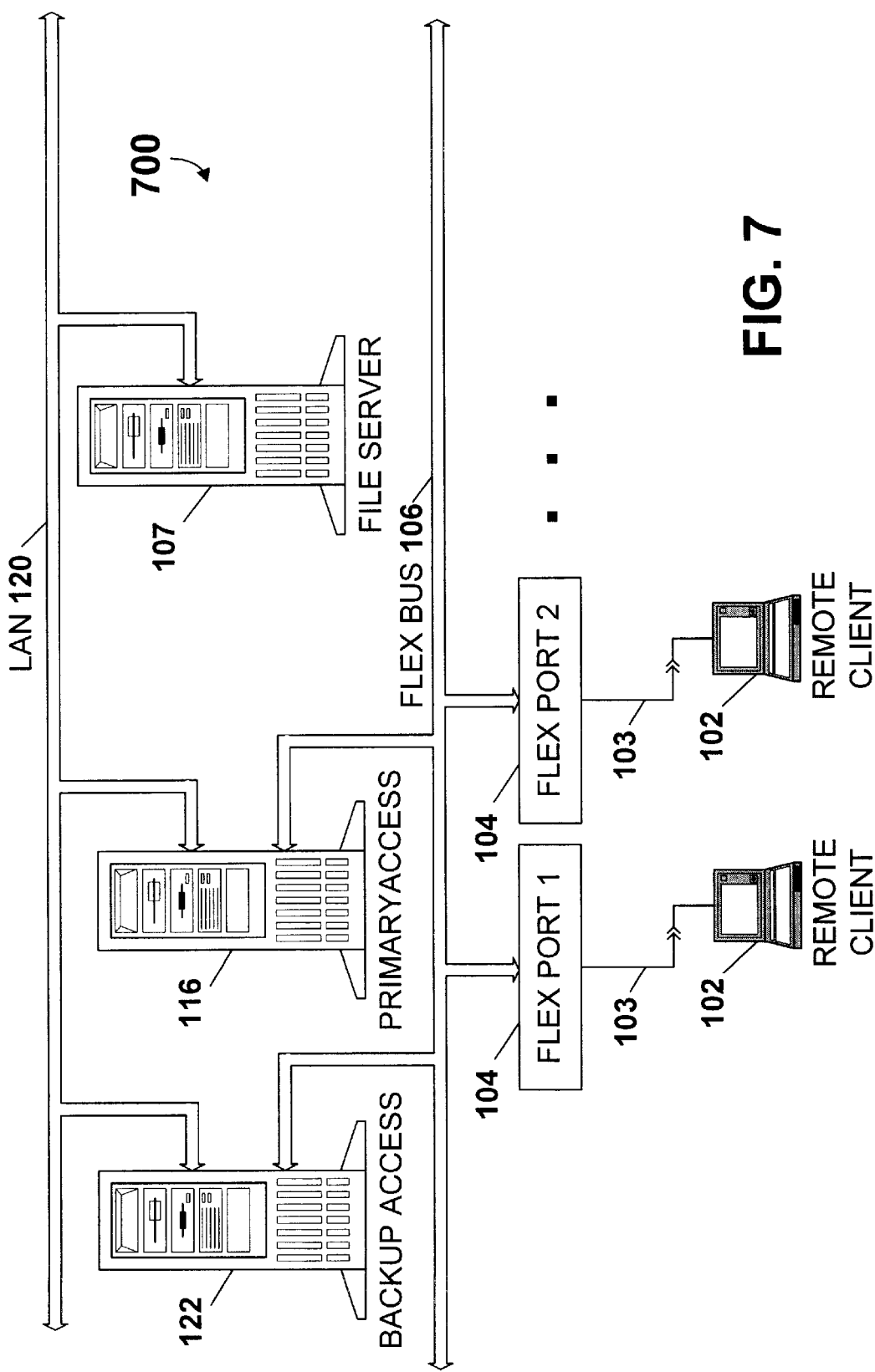
FIG. 7 is a diagram of a network system according to the present invention including a backup access server.

FIG. 7 is a diagram of another network system 700, which is similar to the network 100 of FIG. 1 except that the LAN CARDs 118 and 126 are coupled to the same LAN 120. The access server 116 operates as the primary access server and the access server 122 operates as a backup access server. During normal operation, the primary access server 116 provides and controls access of resources on the LAN 120, such as a file server 107 or the like, to the remote clients 102. The FLEX CARD 114 within the primary access server 116 takes ownership of the ports of the FLEX PORTs 104. Meanwhile, the backup access server 122 monitors activity of the primary access server 116 and activity on the LAN 120. If the primary access server 116 fails, the backup access server 122 detects such failure and immediately takes over ownership the ports currently owned by the primary access server 116. Such conversion of ownership from the primary to the backup server is performed transparently without dropping any of the connections of the remote clients 102, so that service is essentially uninterrupted. Also, such backup configuration substantially improves reliability, since connections are maintained during and after failure of the primary access server.

Security is also enhanced with the network system 100. Security is enforceable at any one or any combination of three points of communication, including communication between the access server 116 and the FLEX CARD 114, communication between the FLEX CARD 114 and a FLEX PORT 104 and communication between the FLEX PORT 104 and a remote client 102. A common security policy may be enforced at all three points if desired. The data stream may be encrypted at the access server 116, at the FLEX CARD 114 or at the FLEX PORTs 104, and decrypted by software running on each remote client 102.

Figure 8:
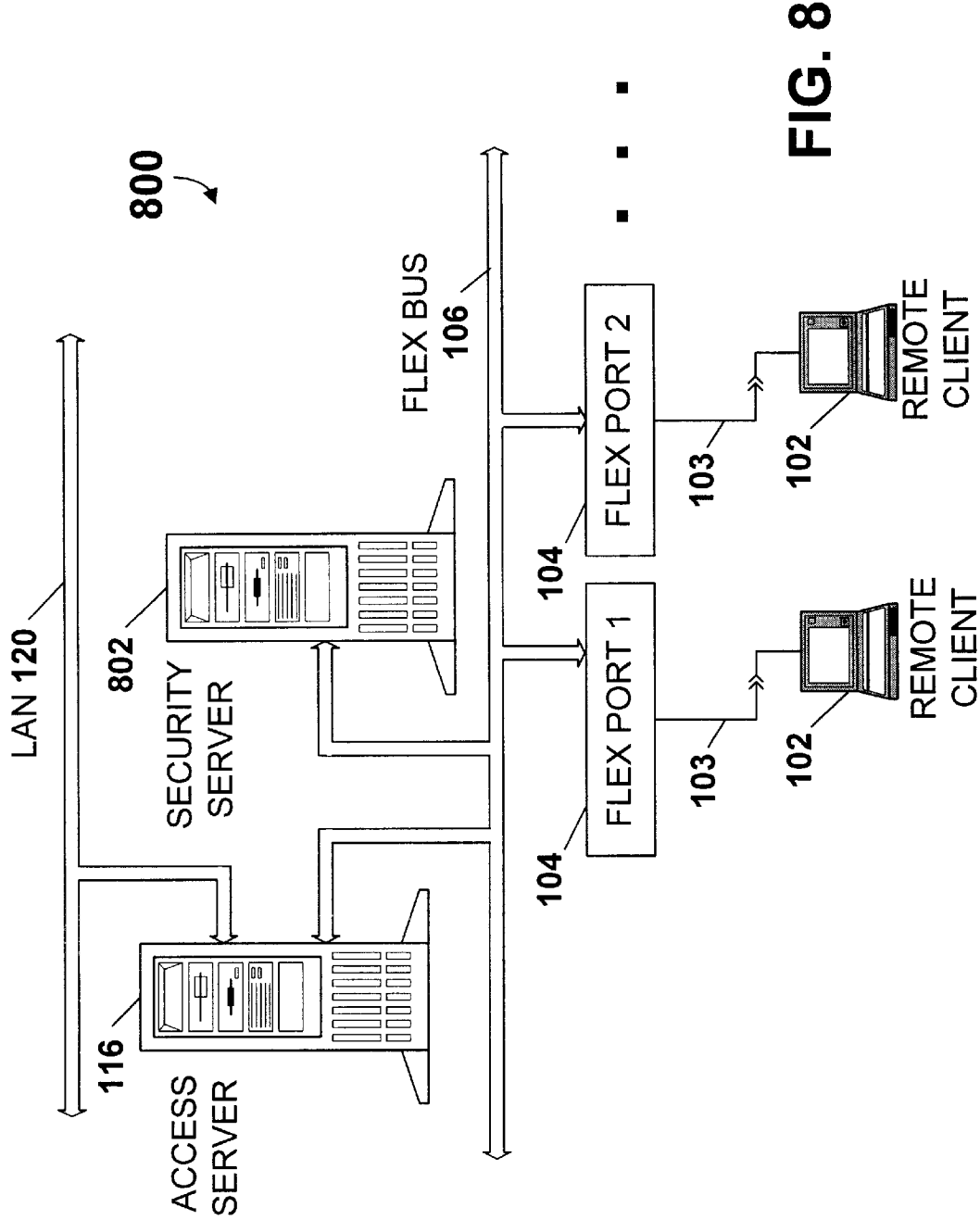
FIG. 8 illustrates an network system according to the present invention including a security server.

FIG. 8 illustrates an network system 800, which is similar to the network system 100 and includes a security server 802 coupled to the FLEX BUS 106 between the FLEX PORT(s) 104 and the FLEX CARD 114. The security server 802 is used to establish a uniform policy of secure access on the FLEX BUS 106. If the security server 802 is imposed in the system, data encryption may occur at the security server 802 if desired. Security may occur in any manner or at any level. For example, a remote client 102 may need to provide a predetermined password or an encrypted public or private key to obtain access. Security also enables management access to provide authority to monitor parameters of the FLEX CARD 114 and/or the FLEX PORT 104 or to change configuration or behavioral operation of network devices.

Figure 9:
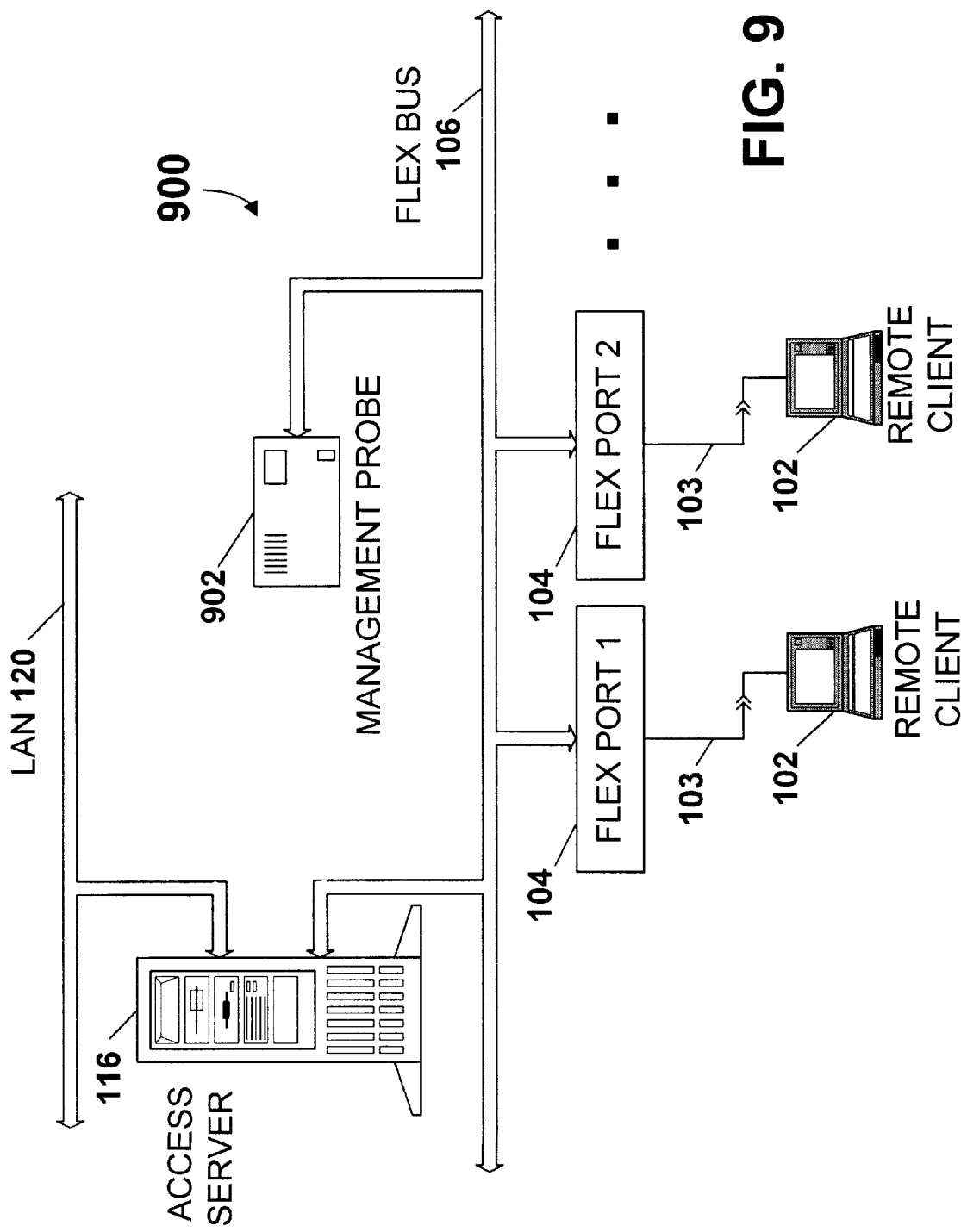
FIG. 9 is a diagram of the network system according to the present invention including a management probe.

FIG. 9 is a diagram of the network system 900, which is similar to the network system 100 and further includes a management probe 902 coupled to the FLEX BUS 106. The management probe 902 is added to enhance manageability and provides functionality similar to a RMON (Remote Network Monitoring) probe. The management probe 902 monitors communication activity between the FLEX CARD 114 and all of the FLEX PORTs 104 coupled to the FLEX BUS 106. From a management information system (MIS) perspective, the network system 900 provides MIS personnel the choice of co-locating or separating communications and services. In this manner, the implementation is matched to the culture of any particular organization.

Any one or any combination of the backup access server 122 of FIG. 7, the security server 802 of FIG. 8 and the management probe 902 of FIG. 9 may be added to the same network system, such as the network system 100. In this manner, a scaleable and distributed network architecture according to the present invention for remote access of one or more local area networks provides scaleability, flexibility, reliability and efficiency to the user.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A network system that couples a plurality of remote clients to at least one local area network (LAN), comprising:
   an access server for coupling to the LAN that executes a network operating system (NOS) to enable communication with the LAN;
   an access bus;
   an access device coupled to said access bus and for coupling to said access server that operates in cooperation with said NOS to establish a communication link between said access server and each of a plurality of clients coupled through said access bus; and
   at least one multiport device coupled to said access bus and for coupling to a plurality of clients through corresponding wide area network (WAN) connections to establish a communication link between each client and said access device.

2. The network system of claim 1, wherein said access server executes an application programming interface to facilitate communication between said NOS and clients coupled through said access device.

3. The network system of claim 1, wherein said access bus is a shared media bus.

4. The network system of claim 1, further comprising:
   said at least one multiport device including a plurality of port slots and interface logic coupled between said access bus and said plurality of port slots; and
   a plurality of communication cards, each configured to interface one of said plurality of port slots of a multiport device and to couple to a corresponding client via a WAN connection, wherein each communication card includes communication logic to operate according to one of a plurality of different communication protocols to enable communication between said corresponding client and said multiport device.

5. The network system of claim 1, wherein said at least one multiport device performs WAN data framing and flow control and WAN signaling protocols with clients coupled thereto.

6. The network system of claim 1, wherein said at least one multiport device performs media and connection management to establish and maintain communication between clients and said access device across said access bus.

7. The network system of claim 6, wherein said access device performs data and traffic management on said access bus and performs media and connection management in cooperation with said at least one multiport device to establish and maintain communication links between clients and the LAN.

8. The network system of claim 1, further comprising:
   said at least one multiport device detecting coupled clients during initialization and during operation and announcing existing and new clients and providing corresponding configuration information on said access bus;
   said access device registering each announced client by detecting said existing and new clients and receiving said configuration information, linking each client to said NOS of said access server and then passing necessary client information to said NOS; and
   said NOS authenticating each client.

9. The network system of claim 1, further comprising:
   said at least one multiport device detecting coupled clients during initialization and during operation and initiating registration of clients by announcing existing and new clients and providing corresponding configuration information on said access bus; and said access device registering each announced client by detecting said announcement and receiving said configuration information, authenticating each client and then linking each authenticated client to said NOS of said access server.

10. The network system of claim 1, further comprising:

a plurality of multiport devices each coupled to said access bus and each for coupling to a corresponding plurality of clients through corresponding remote transmission channels; and said access device cooperating with said plurality of multiport devices to establish a communication link between said access server and any of the clients coupled through said plurality of multiport devices.

11. A scaleable and distributed network system that provides a plurality of communication links between a plurality of remote client devices and at least one local area network (LAN), the network system comprising:

an access server for coupling to the LAN that executes a network operating system (NOS) to enable communication between the LAN and client devices;

an access bus;

an access card coupled to said access bus and for coupling to said access server to establish a plurality of communication links to the LAN, wherein said access card receives port information associated with client devices coupled through said access bus to access the LAN, and establishes and maintains communication between the LAN and client devices via said NOS;

at least one multiport configuration device coupled to said access bus, comprising:

a plurality of port slots; and communication logic coupled to said plurality of port slots and said access bus for detecting connection of client devices through said plurality of port slots, for sending corresponding port information across said access bus, and for establishing and maintaining a communication link between client devices and said access card; and a plurality of communication cards, each configured to interface one of said plurality of port slots of said multiport configuration device, to communicate with at least one client device across a wide area network (WAN) connection and to transfer data between said communication logic and said at least one client device.

12. The network system of claim 11, further comprising:

said access card registering and linking each client to said NOS of said access server and then passing necessary client information to said NOS; and said NOS authenticating each client.

13. The network system of claim 11, further comprising:

said access server including an expansion bus which includes a plurality of expansion slots, each configured to receive an expansion card to interface with said access server; and said access card implemented as an expansion card that is plugged into one of said plurality of expansion slots to interface said access server.

14. The network system of claim 13, further comprising:

a LAN card for coupling to the LAN and implemented as an expansion card that is plugged into one of said plurality of expansion slots to couple the access server to the LAN.

15. The network system of claim 11, wherein said access bus is a dedicated bus.

16. The network system of claim 11, wherein said access bus is a shared media bus.

17. The network system of claim 11, wherein said communication logic of said at least one multiport configuration device comprises:

a system bus coupled to said plurality of port slots; and interface logic coupled to said system bus and said access bus.

18. The network system of claim 11, further comprising:

a plurality of multiport configuration devices each coupled to said access bus and each including a plurality of port slots; and said access card establishing communication links between the LAN and a plurality of client devices coupled through any of said plurality of multiport configuration devices.

19. The network system of claim 11, further comprising:

a plurality of multiport configuration devices each including a system bus and at least one system bus extension for daisy chaining multiport configuration devices together.

20. The network system of claim 11, further comprising:

a backup access server for coupling to the LAN that executes a NOS to control communication between the second LAN and client devices, wherein said backup access server mirrors operation of said access server and takes control in the event of failure of said access server; and a second access card coupled to said access bus and for coupling to said backup access server to establish a plurality of communication links to the LAN in cooperation with said NOS.

21. The network system of claim 11 including a second LAN, further comprising:

a second access server for coupling to the second LAN that executes a NOS to enable communication between the second LAN and client devices coupled through said access bus; and a second access card coupled to said access bus and for coupling to said second access server to establish a plurality of communication links to the second LAN in cooperation with said NOS executed on said second access server.

22. The network system of claim 11, further comprising:

a management probe coupled to said access bus.

23. The network system of claim 11, further comprising:

a security server coupled to said access bus to control access to the LAN.

24. A wide area network (WAN), comprising:

a plurality of remote clients;

a local area network (LAN);

an access server, including:

memory;

at least one processor coupled to said memory that executes a network operating system (NOS);

an expansion bus coupled to said at least one processor and including a plurality of expansion slots, each expansion slot configured to receive an expansion card; and a LAN card coupled to said LAN and configured as an expansion card for plugging into one of said plurality of expansion slots to enable communication between said NOS and said LAN;

an access bus;

an expansion access card coupled to said access bus and plugged into one of said expansion slots of said access server that cooperates with said NOS to establish a communication link between said access server and each of said plurality of remote clients;

at least one multiport device coupled to said access bus, each comprising:
 a plurality of port slots;
 a system bus coupled to said port slots; and
 interface logic coupled to said system bus and said access bus; and a plurality of communication cards, each configured to plug into one of said plurality of port slots of said multiport device and each coupled to a corresponding one of said plurality of remote clients via a WAN connection.

* * * * *